(12) United States Patent
Spoor

(10) Patent No.: US 12,241,493 B2
(45) Date of Patent: Mar. 4, 2025

(54) SECUREMENT SYSTEM AND METHOD

(71) Applicant: Clayton Spoor, Sunnyvale, TX (US)

(72) Inventor: Clayton Spoor, Sunnyvale, TX (US)

( * ) Notice: Subject to any disclaimer, the term of this patent is extended or adjusted under 35 U.S.C. 154(b) by 0 days.

(21) Appl. No.: 18/396,939

(22) Filed: Dec. 27, 2023

(65) Prior Publication Data

US 2024/0125344 A1 Apr. 18, 2024

Related U.S. Application Data

(63) Continuation of application No. 17/554,020, filed on Dec. 17, 2021, now Pat. No. 11,898,586.

(60) Provisional application No. 63/127,623, filed on Dec. 18, 2020.

(51) Int. Cl.
*F16B 23/00* (2006.01)

(52) U.S. Cl.
CPC .............................. *F16B 23/0007* (2013.01)

(58) Field of Classification Search
CPC .......................... F16B 23/0007; F16B 23/0061
See application file for complete search history.

(56) References Cited

U.S. PATENT DOCUMENTS

| | | | | |
|---|---|---|---|---|
| 3,202,880 A | * | 8/1965 | Stanback | H02B 1/056 361/635 |
| 4,480,514 A | * | 11/1984 | Ponziani | B25B 15/005 81/461 |
| 6,857,340 B2 | | 2/2005 | Wagner | |

* cited by examiner

*Primary Examiner* — Jason L Vaughan
*Assistant Examiner* — Amanda Kreiling
(74) *Attorney, Agent, or Firm* — Braxton Perrone, PLLC; Bobby W. Braxton; Gregory Perrone

(57) ABSTRACT

A system and method for securing an item. Custom connectors which only couple to a custom converter can secure an item, deter its theft, and prevent unauthorized access. The custom connectors have a custom head which has a custom void. The custom void has a unique shape which matches and couples with a custom converter. A custom converter allows the custom connector to be manipulated. If desired, subsequently, when the item is in a more secure location, conventional screws can replace the item.

12 Claims, 2 Drawing Sheets

SECUREMENT SYSTEM AND METHOD

PRIORITY

This application is a continuation of allowed U.S. Non-Provisional application Ser. No. 17/554,020 filed Dec. 17, 2021, which claims priority to U.S. Application No. 63/127,623, filed Dec. 18, 2020, the entirety of both of which are hereby incorporated by reference.

BACKGROUND OF THE INVENTION

Technical Field

The present invention relates to a system and method for securing an item.

Description of Related Art

Often items are stored or coupled via conventional screws or bolts. However, these conventional screws can be easily removed and the underlying item removed or stolen. Consequently, there is a need to better secure items.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

As noted, often items are secured via a conventional screw. As used herein a conventional screw refers to a screw, bolt, or the like, which has a customary head. Conventional screws, for example, often had Phillips head or flat head to couple with Phillips or flat head screw drivers. It should be noted that while the term "screw" is used, this is for illustrative purposes only and should not be deemed limiting. Virtually any solid object which is used to connect to another object via threading or the like can be utilized. Thus, the system and method discussed herein also applies to bolts, screws, etc.

A problem with Phillips or flat head, or other such conventional heads, is that these heads are so conventional that almost everyone has a screwdriver to match the screw. Thus, if a panel, for example, is attached via screws with a Phillips head, anyone with a matching screwdriver can remove the screws and access the panel.

Figure 1:
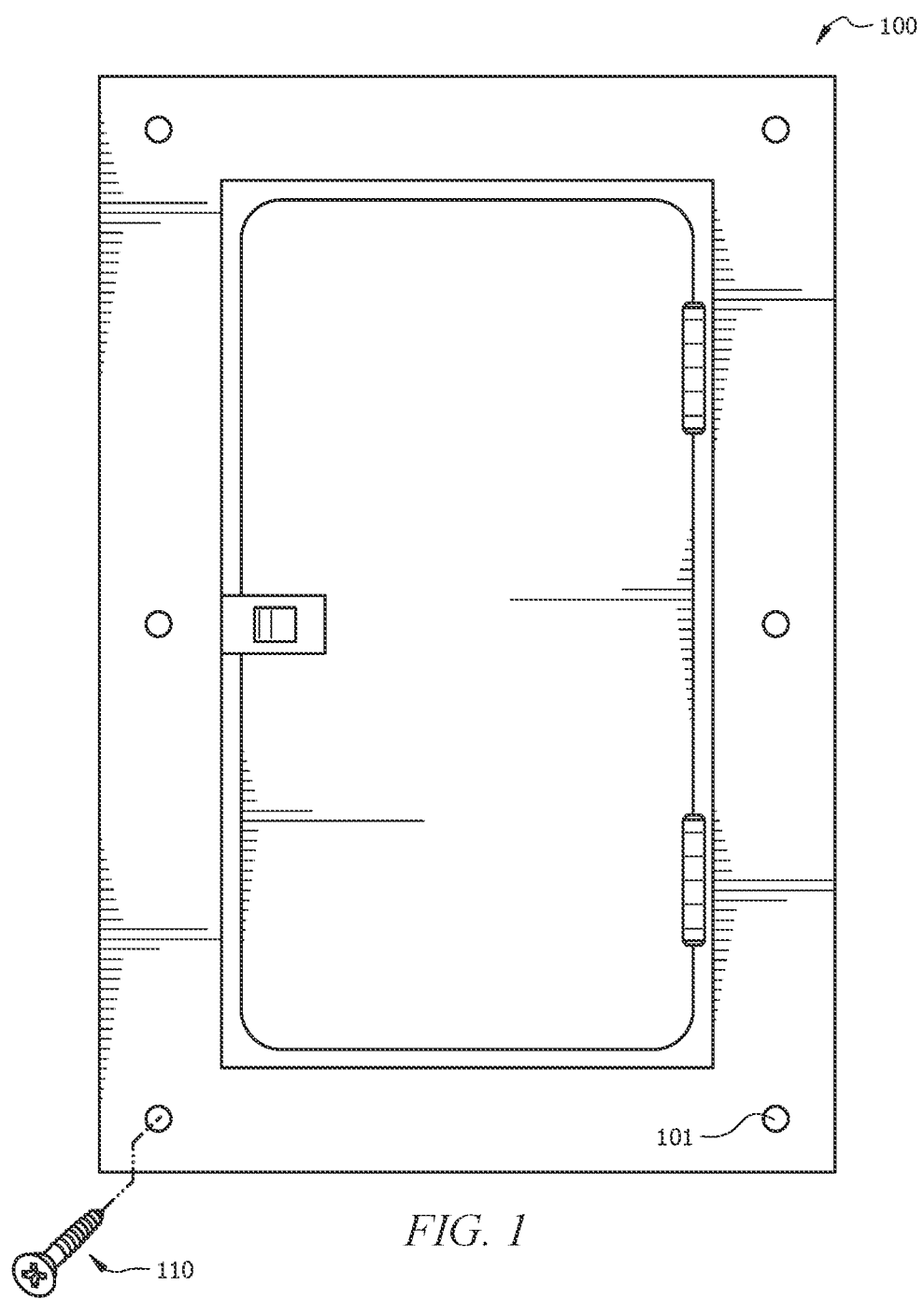
FIG. 1 is a top view of a cover in one embodiment.

FIG. 1 is a top view of a cover 100 in one embodiment. A cover 100 can be used to cover, house, or secure any item or void. As depicted, the cover 100 comprises mount holes 101 through which a screw can be affixed to mount or secure the cover 100. The cover 100 may further include a lock or other device.

In the embodiment depicted, the cover 100 is an electrical panel. The system and method will be described in reference to an electrical panel, but this is for illustrative purposes only and should not be deemed limiting. The system and method can apply to any cover or device which is used to house or secure an item.

Electrical panels are placed in virtually any building or dwelling. When houses, commercial buildings, or apartments are being built, there are many electrical panels on the job site. With ever changing requirements and codes, the circuit breakers are becoming more and more expensive. Thieves can go to a job site for a new apartment building and there can be over one hundred panels and circuit breakers. The thieves can use conventional screwdrivers to remove the cover 100 of a panel and remove the circuit breakers which are secured behind the cover 100. Even if the cover is locked, the panel can be opened and the circuit breakers stolen. These circuit breakers can cost between $50-60. Often there are ten of these circuit breakers in each panel. Accordingly, one panel has about $600 worth of circuit breakers. In some jobsites, there are 300 units with circuit breakers worth about $180,000. Accordingly, finding a job site with potentially over hundreds of circuit breakers can be a significant attraction for thieves.

Figure 2:
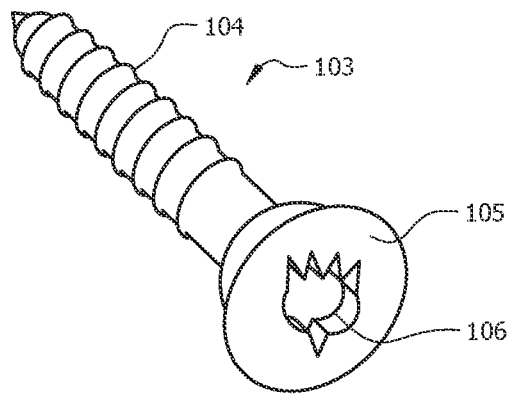
FIG. 2 is a perspective view of a custom screw in one embodiment.

Turning to FIG. 2, FIG. 2 is a perspective view of a custom connector in one embodiment. A custom connector, as used herein, refers to a screw, bolt, or the like, which has an unconventional head. While some embodiments will describe a screw, this is for illustrative purposes only and should not be deemed limiting. A custom connector uses threading, or the like, to connect to an object or connect two or more objects. The connector can attach to an object which has threading, for example.

An unconventional head can refer to a head which is either not widely available or a specifically unique shape. A custom connector cannot be coupled via a conventional screwdriver or conventional screwdriver set.

As depicted, the custom connector 103 comprises a connector body 104. A connector body 104 typically has threads which mate and couple with a housing which can receive and couple with the threads.

The custom connector 103 also has a connector head 105. The connector head 105 typically has an outer diameter greater than the connector body 104. The connector head 105 extends beyond the mount hole 101 and prevents the screw 103 from going beyond the cover 100.

The custom connector 103 also comprises a custom void 106. A void is a recess which can receive a head to allow a torque to be applied to the screw. Conventional screws had a conventional void 107 (FIG. 4) which can make with conventional screwdrivers. The operator can then apply a torque upon the conventional screw 110 with the screwdriver via the conventional void 107. A custom void 106, as noted, is a void which does not mate with a conventional screwdriver or other conventional tools. In one embodiment, a Phillips head or flat head screwdriver, for example, will not couple or mate with the custom connector 103. In one embodiment, a hex wrench will not couple or mate with the custom connector 103. Put differently, in some embodiments, conventional tools cannot be used to rotate the custom connector 103. The custom void 106 prevents conventional screwdrivers or other tools with conventional heads to couple with the custom connector 103. Instead, the custom void 106 requires an unconventional head which can mate with the custom void 106. The unconventional head can mate with the custom void 106 and torque the connector 103, such as a screw.

The shape for the custom void 106 can vary. In one embodiment the shape is random such that conventional screwdrivers will not engage the shape of the head. In one embodiment the custom void 106 comprises a shape which is dissimilar from hex wrenches or other common coupling devices. In this manner, the user must have a tool which matches with the custom void 106. In one embodiment the custom void 106 has a unique shape which is sufficiently distinct from hex wrenches, Phillips screwdrivers, or flathead screw drivers such that these conventional tools will not sufficiently grip the head of the custom connector 103 to cause the connector 103 to rotate. As noted, in one embodiment, a user requires a specialized tool and cannot use a conventional off-the-shelf tool to couple with the custom void 106. This prevents theft as the potential thief may have a conventional tool but will not have a tool which couples with the custom void 106 such that the custom connector 103 can be removed. By preventing the ability to remove the custom connector 103, the contents or item which is secured via the custom connector 103, is better protected.

Figure 3:
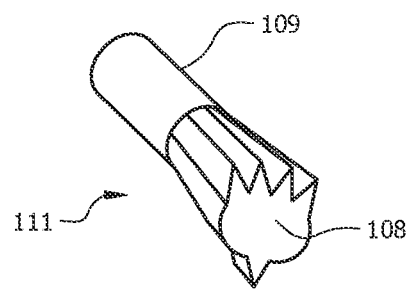
FIG. 3 is a perspective view of a custom head in one embodiment.

FIG. 3 is a perspective view of a custom converter in one embodiment. The custom converter 111 is an unconventional tool which is not widely available. Rather, the custom converter 111 comprises a custom coupler 108 which mates with the shape of the custom void 106.

The custom converter 108 can comprise any material including metal, plastic, and combinations thereof. The custom converter 108 in one embodiment comprises a material rigid enough to impart the required torque.

As depicted the custom converter 108 is coupled to an adapter 109. An adapter 109 allows the custom converter 111 to be coupled to other conventional tools. Thus, the adapter 109 can have a female hex set, as an example. A mating conventional hex tool can mate with the female hex to couple the tool with the custom converter 111. The adapter 109 can be made to couple with virtually any type of tools including wrenches, sockets, hex screws, screw drivers, drills, etc.

While one embodiment has been shown wherein an adapter 109 couples with a separate tool, in other embodiments the tool is integrally made with the custom converter 111. In such embodiments a separate tool is not needed as it is already attached to the custom converter 111.

As noted, a custom converter 111 is required to manipulate the custom connector 103. Accordingly, if a panel or cover 100 is installed with custom connectors 103, the panel cannot be removed with conventional tools. Rather, a custom converter 111 will be required to remove the custom screws 103.

In this fashion, the electrical panels previously discussed can be installed with one or more custom connectors 103, such as screws. As shown in FIG. 1 there are six mount holes 101. The user can install one, two, or more custom connectors 103 in the cover 100.

Sticking with the jobsite scenario, when the buildings are still being constructed, the user can install the panels with the custom connectors 103. This is due, in part, to the accessibility of a building under construction. Often the building does not have locking doors, and anyone can go to the jobsite and have access to the internals of the yet-to-be completed building. If a thief goes to the electrical panel and tries to use a conventional screw to remove the cover 100 they will be unable to do so. Accordingly, the contents behind the cover 100 remain safe. Only those who have access to the rare and unconventional custom converter 111 have access to the panel.

Figure 4:
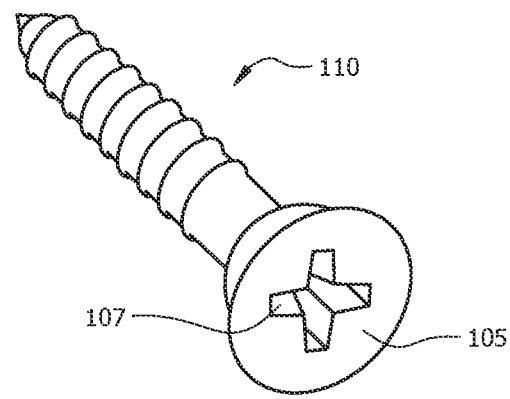
FIG. 4 is a perspective view of a conventional screw in one embodiment.

However, when the building has been completed, the building now has a locking door, and the owner takes possession, there is less likelihood that the panels or its contents will be stolen. Accordingly, at that point, in one embodiment, the custom connectors 103 can be replaced with conventional screws 110, as shown in FIG. 4. FIG. 4 is a perspective view of a conventional screw in one embodiment.

Because a conventional screw 110 has been used on the cover 101, the owner, who likely only has access to conventional tools, has the tools necessary to open and remove the cover 101.

Accordingly, in one embodiment the cover 100 is coupled with custom connectors 103 for a period when the cover 100 is vulnerable, such as during construction. However, when construction is complete, the custom connectors 103 are replaced with conventional connectors, such as screws. At that point the cover 100 is less vulnerable. Additionally, the end user is free to enjoy the versatility of conventional screws 110 which can be removed by owners with conventional tools. Thus, the method and system discussed herein provide an opportunity to secure items when vulnerable, but go back to a more conventional securement means when the vulnerability has ended.

Sticking with the electrical panel example, the user will employ one or more custom connectors 103 to install the cover 100. First the user will obtain at least one or a plurality of custom connectors 103 having at least one head, and wherein the head has a custom void 106. The user then obtains a custom converter which mates with the custom void. In some embodiments the custom converter is sold with the custom connectors 103. The custom converter is then rotated to impart torque to the connector 103. Once attached, the custom connectors 103 secure the item in place. After the construction is complete, the custom connectors 103 are removed and conventional screws 110 are used to replace the custom screws 103. In other embodiments, however, the custom connectors 103 remain in place.

While an electrical panel has been described, this is for illustrative purposes only and should not be deemed limiting. The system and method discussed herein can be used to replace virtually any conventional connector, such as screws, to make it more secure and less prone to theft or manipulation. As but one further example, if a manufacturer of a grill, for example, does not want the end user to open a panel, the panel can be secured via custom connectors 103. There are a host of reasons why the manufacturer may want to deny access to a specific panel. By utilizing custom connectors, end user is denied access to that specific panel. Accordingly, the panel is secured. The manufacturer may or may not provide the matching custom converter. In this way, the manufacturer prevents undesired access into a panel. The user would not be able to open the panel. If conventional screws were utilized, the user could simply use any conventional screwdriver to gain access. Thus, while one benefit is theft prevention, another benefit is controlling access.

In the grill embodiment, as an example, this provides a method for the manufacturer to monitor and verify if the panel has been opened. As an example, opening the panel can void the warranty. If the custom connectors are removed, or replaced, this serves as proof that the user voided the warranty by opening the panel.

On another spin of the grill example, consider a thermostat in a public building. Often these are locked. However, if they are locked with conventional screws, for example, anyone with a screwdriver can simply remove the screw and adjust the thermostat. If a custom connector is utilized, only those with the corresponding custom converter can open the thermostat. Accordingly, the custom connectors can be utilized to prevent unauthorized access.

As another example, consider a shed with a pad lock. While the pad lock might be difficult to break, the pad lock is secured via a hinge. Or, the shed doors are connected via hinges. If either of these hinges comprise conventional screws, a potential thief can simply remove either hinge and bypass the pad lock without requiring breaking of the pad lock. If, however, the hinges use custom connectors, the hinges cannot be used except by a person who has a custom converter. Thus, the potential thief is deterred.

The custom connectors 103 can be custom to a job, a house, a jobsite, or a company. For example, an electrician can have a custom converter 111 and a plurality of matching custom connectors 103. Every time the electrician installs a new panel, the electrician uses the same custom connectors 103. Only that electrician can remove the custom connectors 103 and replace them with conventional screws. The electrician can use and reuse the same custom connectors 103 and corresponding custom converter 111 for several years. Because the custom connectors 103, in some embodiments, are removed at job completion, the electrician can continue to use the custom connectors 103 for many subsequent jobs. If connectors 103 become lost or stripped, the electrician can reorder custom connectors 103 which fit the existing custom converter 111.

Thus, in one embodiment, the installer keeps the custom connector 103. In other embodiments, however, the end user keeps the custom connectors 103. As an example, rather than the electrician keeping the custom connectors 103, the homeowner keeps the custom connectors 103. The homeowner can decide if they want to replace the custom connectors 103 with conventional screws or not.

In still another embodiment the custom connectors 103 are sold with the cover 100, panel, or other item to be protected from theft or unauthorized access. As an example, in the embodiment depicted in FIG. 1, when a user, either homeowner or electrician, purchases the electrical panel, the panel comes with a set of custom connectors 103 for construction as well a matching custom converter. The panel can also come with a set of conventional screws 110 for post construction.

While an embodiment has described using electrical panels, this is for illustrative purposes only and should not be deemed limiting. The system and method discussed herein can be used to secure virtually any item. As an example, televisions and outdoor furniture are often stored outside where they are easily stolen. They can be secured with the custom connectors 103 described herein. As noted, the custom connectors 103 have application in grills, thermostats, cabinets, and any other area where the user desires to deter theft or deter and limit access.

Additionally, items which are shipped can be shipped with the custom connectors 103 so as to prevent disassembling of the item. However, upon delivery, the final owner can convert to conventional screws 110.

While the invention has been particularly shown and described with reference to a preferred embodiment, it will be understood by those skilled in the art that various changes in form and detail may be made therein without departing from the spirit and scope of the invention.

What is claimed is:

1. A system for securing an item, said system comprising: a plurality of custom connectors for use when said item is vulnerable to theft, each of said plurality of custom connectors having at least one head, wherein said head comprises a custom void, and wherein said system comprises a plurality of conventional screws which are only used to replace the custom connectors when said item is no longer vulnerable to theft; further comprising a custom converter which couples with said custom void, and wherein torque applied to said custom converter is applied to said custom connector.

2. The system of claim 1 wherein each of said custom connectors comprise a body.

3. The system of claim 1 wherein each of said custom connectors comprises a screw.

4. The system of claim 1 wherein said custom converter comprises a custom coupler which is shaped to mate with said custom void.

5. The system of claim 1 wherein said custom converter comprises an adapter.

6. The system of claim 5 wherein said adapter fits onto a tool.

7. The system of claim 6 wherein said tool comprises a conventional shape, and wherein said custom void comprises a non-conventional shape.

8. The system of claim 6 wherein said custom void will not mate with a flat-head screwdriver.

9. The system of claim 1 used to secure an electrical panel.

10. The system of claim 1 used to prevent unauthorized access.

11. The system of claim 1 wherein said custom connectors will not mate with a hex wrench.

12. The system of claim 1 wherein said custom connector will not mate with a Phillips screw driver.

* * * * *